United States Patent
Salley et al.

[19]

[11] Patent Number: 5,853,270
[45] Date of Patent: Dec. 29, 1998

[54] DRILL JIG

[75] Inventors: Brent C. Salley; Harry N. Windle, both of Gainesville, Fla.

[73] Assignee: Precision Glass and Storefront, Inc., Gainesville, Fla.

[21] Appl. No.: 691,581

[22] Filed: Aug. 2, 1996

[51] Int. Cl.$^6$ ................................................. B23B 39/00
[52] U.S. Cl. .................. 408/87; 408/89; 408/115 R; 269/305; 269/293
[58] Field of Search ............................. 408/87, 89, 234, 408/72 R, 115 R, 97; 269/305, 294, 293

[56]  References Cited

U.S. PATENT DOCUMENTS

| | | | |
|---|---|---|---|
| 3,039,332 | 6/1962 | Johnson | 408/87 |
| 3,428,100 | 2/1969 | Melpolder | 408/87 |
| 4,131,040 | 12/1978 | Bollmer | 269/293 |
| 4,579,485 | 4/1986 | Connor et al. | 408/72 |

*Primary Examiner*—Daniel W. Howell
*Assistant Examiner*—Adesh Bhargava
*Attorney, Agent, or Firm*—Arthur G. Yeager

[57] ABSTRACT

A drill jig assembly for drilling holes in an extruded aluminum shape; including a metal channel base, a plastic plate having upright hole patterns and a plurality of position pins located in the holes for positioning the shape widthwise for drilling, and an extension arm for positioning a stop pin against which the shape can be positioned lengthwise for drilling. This jig is used principally for drilling assembly holes in an aluminum window vertical frame piece to correspond to a pair of spaced sprues in the horizontal frame piece and different positioning pins are required for different shapes and different hole patterns in the plate likewise are required to accommodate for different shapes.

15 Claims, 4 Drawing Sheets

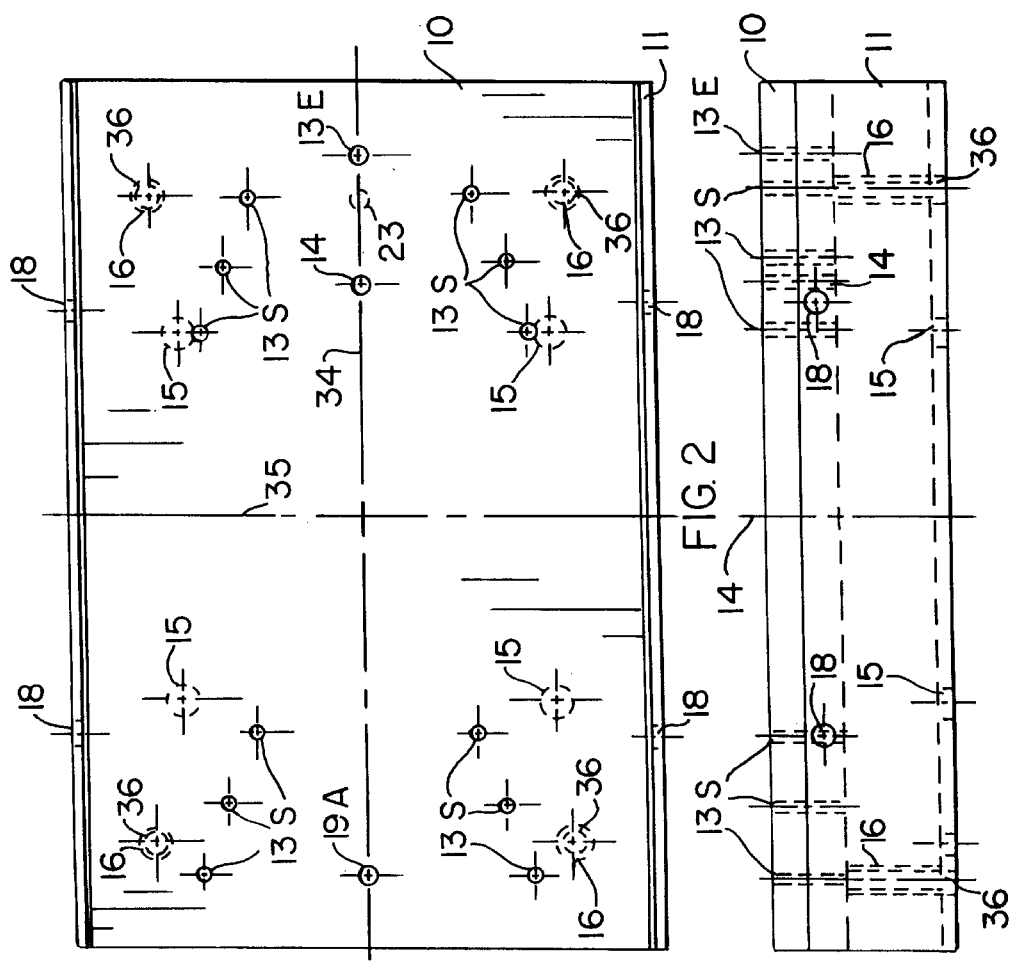

5,853,270

DRILL JIG

BACKGROUND OF THE INVENTION

1. Technical Field

This invention relates to a mechanical fixture for use in quickly positioning a workpiece in a precise location on the bed of a drill press for drilling a hole or performing other cutting operations; and more precisely, it relates to a drill jig for use in drilling holes in aluminum extrusions cut to a predetermined length.

2. Prior Art

In recent years aluminum extrusions have become widely used to replace wood in many building applications, because high quality wood is becoming scarce and high priced. The aluminum extrusion can be made in almost any closed tubular or open nontubular shape and cut to any reasonable length. Thus, aluminum extrusions are apt replacements for wood. Generally aluminum extrusions can be attached to surrounding structural pieces by nails, screws, adhesives, or by welding in special situations. The easiest attaching means for aluminum extrusions are screws and a bolt-and-nut combination.

The present invention involves aluminum storefront extrusions, both closed and open, for use as a window sash, which are cut and assembled with a suitable glazing to make a complete window that may be installed in a building. The present invention in detail is a drilling jig which is used to position pieces of storefront metal on the bed of a drill press for drilling one or more holes in the extrusion to receive screws for assembly of pieces of sash with a piece of glazing to make a complete window.

It is an object of this invention to provide a drill jig assembly to drill assembly holes in aluminum extrusion shapes for use as the sash of windows. It is another object of the invention to provide a drill jig with an adjustable support plate to provide a level base upon which an aluminum extrusion piece rests and is positioned against several guide pins placed in the level base to drill one or more holes for use in assembling sash pieces to a piece of glazing to produce a window. Still other objects will become apparent from the more detailed description which follows.

BRIEF SUMMARY OF THE INVENTION

This invention relates to a drill jig assembly for positioning a workpiece on the bed of a drill press for drilling holes in the workpiece. The assembly includes a channel base which is fastenable to the drill press bed. A levelable plate is attachable to the channel base and serves as a supporting surface for the workpiece, in preferred use, the workpiece being a piece of an aluminum extrusion to be made into a window sash. The workpiece is positioned under the head of a drill press by means of guide pins placed in holes in the levelable plate, and the operator merely holds the workpiece tightly against the guide pins while drilling a hole in the workpiece.

In specific embodiments the levelable plate is attached to the channel base by set screws which are loosened to allow the plate to be made level and then tightened to hold the plate in place. In another preferred embodiment guide pins are placed in holes drilled in the level plate, the pins having spacer means attached thereto and the workpiece is positioned by being held tightly against those spacer means. An extension to the level plate with a guide pin attached is available to serve as a longitudinal stop to assist in positioning the workpiece for drilling.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 2 is a top plan view of the jig plate positioned on the holder channel of this invention;

FIG. 3 is a front elevational view of the jig plate and holder channel of this invention;

FIG. 4 is a left end elevational view of the jig plate and holder channel of this invention;

DETAILED DESCRIPTION OF THE INVENTION

The invention is best understood by making reference to the attached drawings illustrating various features of the invention, wherein numbers refer to those features, like numbers in different drawings being meant to refer to the same feature.

Figure 1:
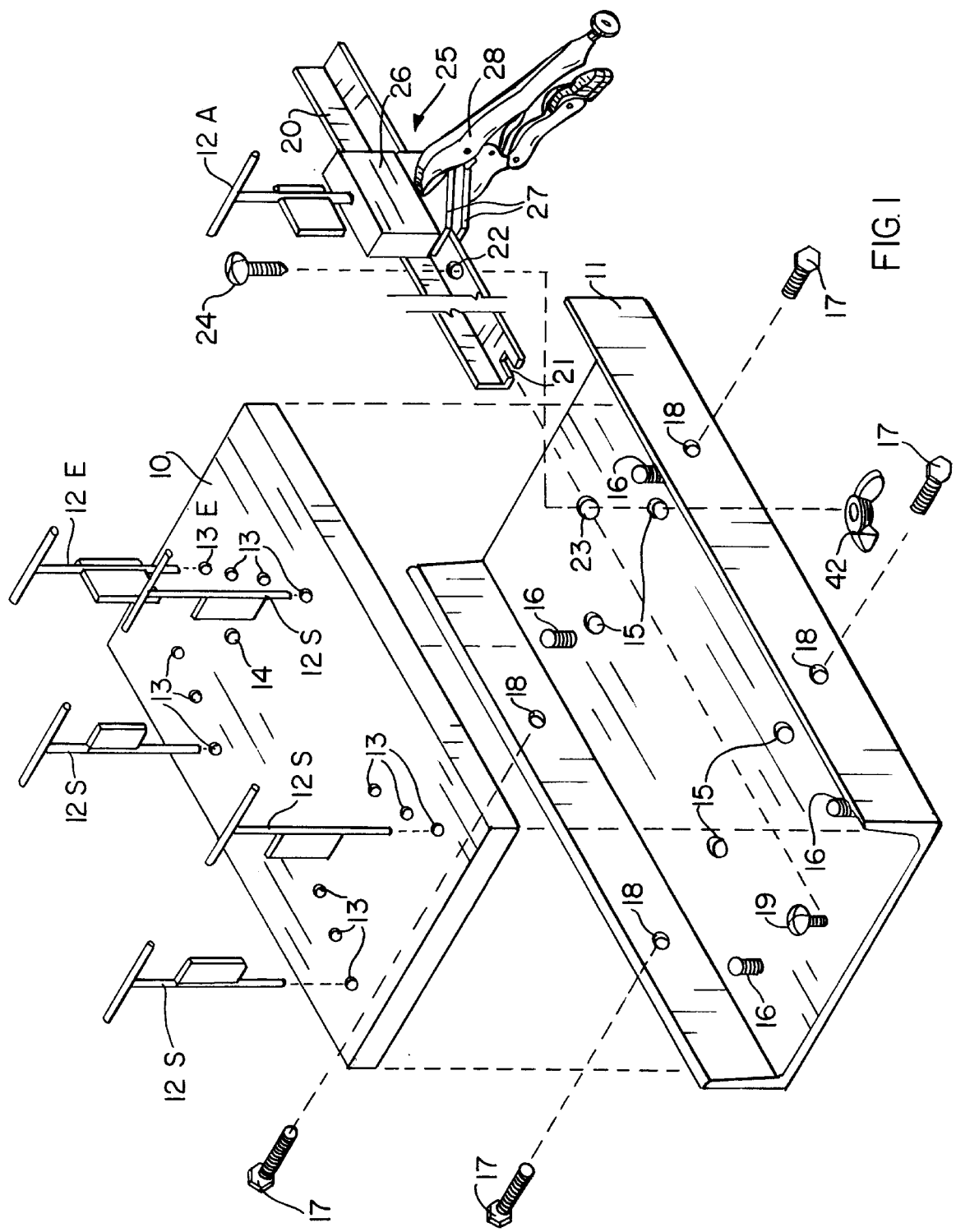
FIG. 1 is an exploded perspective view of the drill jig assembly of this invention.

In FIG. 1 the several parts of the invention are shown as well as their attachment to other parts of the invention. The basic pieces of the invention include the channel base or channel holder 11 which supports the jig plate 10, which in turn supports one or more guide pins 12, which serve as supports against which a workpiece (not shown) is held while a hole is drilled by a drill press (not shown). The channel base 11 is intended to rest directly on the bed of the drill press and be rigidly attached thereto by means of bolts passing through holes 15 in the channel base 11. Plate 10 rests upon a plurality (four are shown) of leveling studs 16 screwed into threaded holes in channel base 11. When studs are adjusted to make plate 10 level, screws 17 engaged in holes 18 in the flanges of channel base 11 are tightened against the edges of plate 10 to clamp it in a level position. Four screws 17 and holes 18 are shown, but there could be any number from three upwards.

Jig plate 10 has a central hole 14 located adjacent and generally aligned with end hole 13E where the drill bit in the drill press can enter when everything is centered for the workpieces to be drilled. There may be a plurality of sets of holes 13 for locating guide pins 12. In FIG. 1 there are shown four pins 12 S, one pin 12 E and one pin 12 A. Generally in the drilling of storefront extrusions the holes are drilled in pairs, one hole on each side of the glazing or glass pane; i.e., one on the inside and one on the outside (with respect to the inside and outside of the building where the storefront is to be installed. The screws used in the holes drilled in the jig of this invention may join a vertical extrusion to a horizontal extrusion of the storefront; there being for a rectangular storefront two spaced parallel vertical extrusion pieces and two spaced parallel horizontal extrusion pieces to hold the four sides of a rectangular glass pane. The drawing in FIG. 1 shows an arrangement of holes 13 and guide pins 12 S and 12 E for drilling one such pair of holes. One side of the workpiece (not shown here) is held against one pair of pins 12 S and the end of the workpiece against pin 12 E, when one of the holes is drilled in the workpiece. Then the workpiece is moved laterally to bear against the other two pins 12 S and also with the end against pin 12 E, at which point the second of the two holes is drilled in the workpiece as explained more fully by considering FIGS. 6 and 7. There are different sizes of guide pins (see FIG. 5) and three different sets of holes 13 are shown for receiving guide pins 12. These alternative guide pins 12 and holes 13 are for different makes and sizes of workpieces, and/or different holes to be drilled in any one workpiece. If the holes to be drilled in the workpiece are close to the end resting against pin 12 E the arrangement on plate 10 of FIG. 1 is used. If the holes to be drilled are much farther away from the end of the workpiece, the adjustable stop assembly 25 is used in place of the pin 12 E.

In this alternative arrangement an angle beam 20 is fastened to the base web of channel base 11 by connecting screw 19 with notch 21, aligning holes 22 and 23, and tightening wing nut 42 on to screw 24 passing through holes 22 and 23. This provides an elongated arm of angle beam 20 to which an adjustable stop means may be attached. This adjustable stop means includes adjustable clamp 28 having wide flat jaws 27 and block 26 attached thereto. This combination is adjusted to the selected location and clamped tightly to the horizontal web of angle beam 20 such that the workpiece can be butted against the spacer piece projecting out from the vertical spine of pin 12 A. By means of this adjustable stop assembly the main portion of this drilling jig can be kept small and simple.

In FIGS. 2–4 there is shown the arrangement of jig plate 10 and channel base 10. It may be seen in FIG. 4 especially, that plate 10 is intended to fit inside the webs of channel base 11, but with close tolerances so that screws 17 (see FIG. 1) may be easily inserted in holes 18 and be tightened against plate 10 to hold it solidly in place in a level arrangement. Leveling studs 16 are engaged in threaded holes 36 in the bottom web of channel base 11 to accomplish the leveling of plate 10 for the drilling operations. Holes 13 S and 13 E may be seen in plate 10 for the mounting of guide pins for the sides and end of the workpiece, respectively. Holes 19 A and 23 are for screws 19 and 24, respectively.

Figure 5:
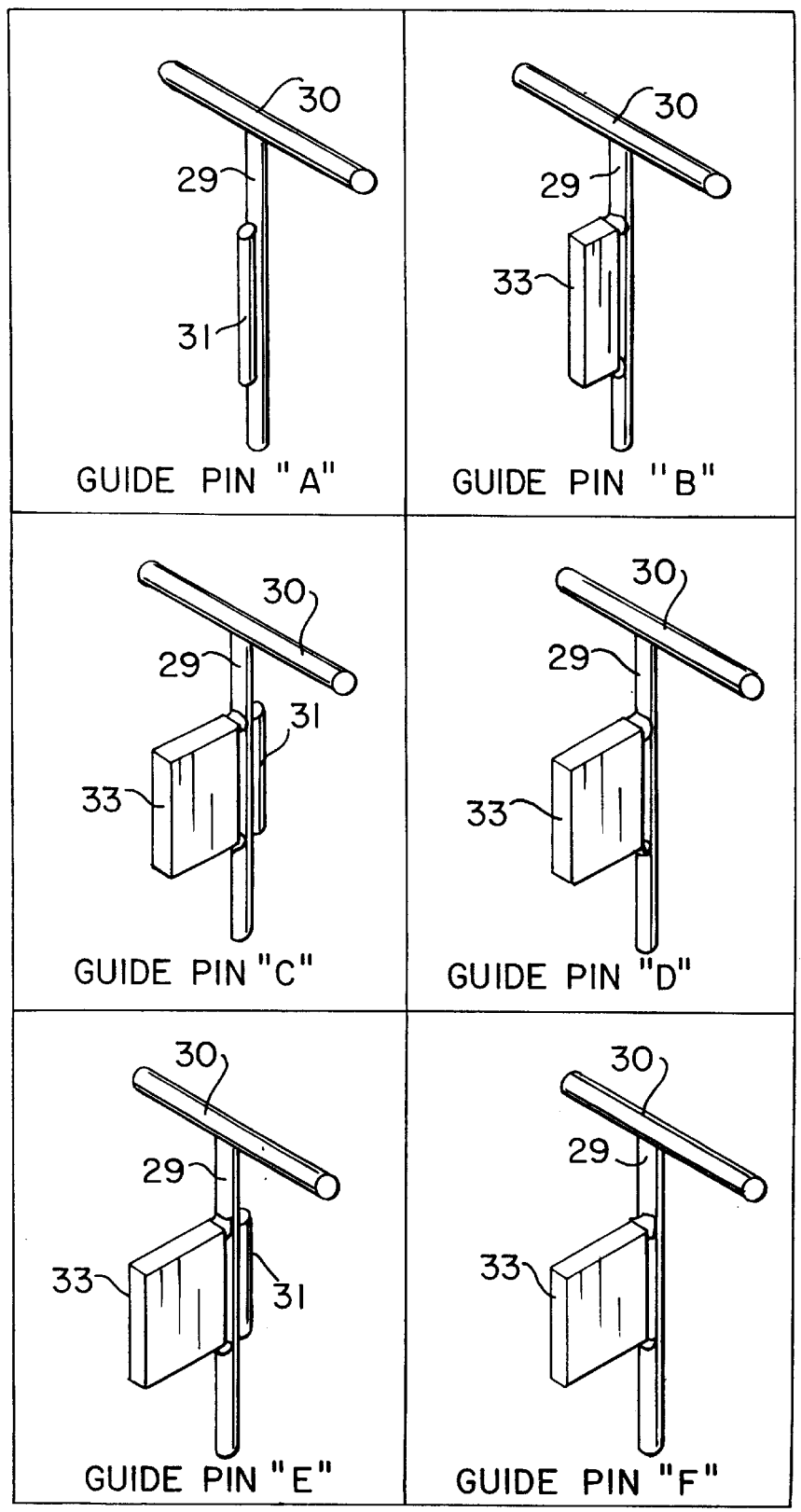
FIG. 5 is a group of perspective views of several guide pins that are employed with this invention.

In FIG. 5 there are shown a variety of guide pins 12. They are all generally similar in design, but differ with respect to the spacer portions. With different pins used in the same holes 13 (FIG. 1) a variety of workpieces may be drilled by use of the same jig of this invention. As seen in FIG. 5 there are eight examples of how the pin is modified to provide a spacer element on the pin. Pin "A" has a ¼" rod 31 welded to vertical piece 29. Pin "B" has a plate 33 welded to vertical piece 29 so as to provide a space of ½" from piece 29. Pin "C" has a plate 33 welded to the front of vertical piece 29 and a ¼" rod 31 (as in Pin "A") welded to the rear of vertical piece 29. This provides a pin with two alternative uses; one for a space of 1.125 inches, and the other (if Pin "C" is turned 180 degrees) for a space of ¼" as in Pin "A". Pin "D" has a plate 33 welded to vertical piece 29 to provide a space of 1.125 inches. Pin "E" is a doubly useful pin as is Pin "C". It has a plate 33 for a space of 1.25 inches or a ¼" rod 31 for a space of ¼". Pin "F" has a plate 33 to provide a space of 1.25 inches. Many other spacer plates and/or rods could be used to provide other spaces. An upper cross bar 30 is part of each guide pin to serve as a convenient handle for placing the guide pin in or taking it out of a hole such as 13 in plate 10 (see FIGS. 1 and 2). By a proper choice of pins as shown in FIG. 5 the same holes 13 in plate 10 can be used for many different workpieces. If no combination is suitable, a new position for another set of holes 13 can be drilled to serve for any workpiece that does not fit the present availability of pins 12 and holes 13.

Figure 6:
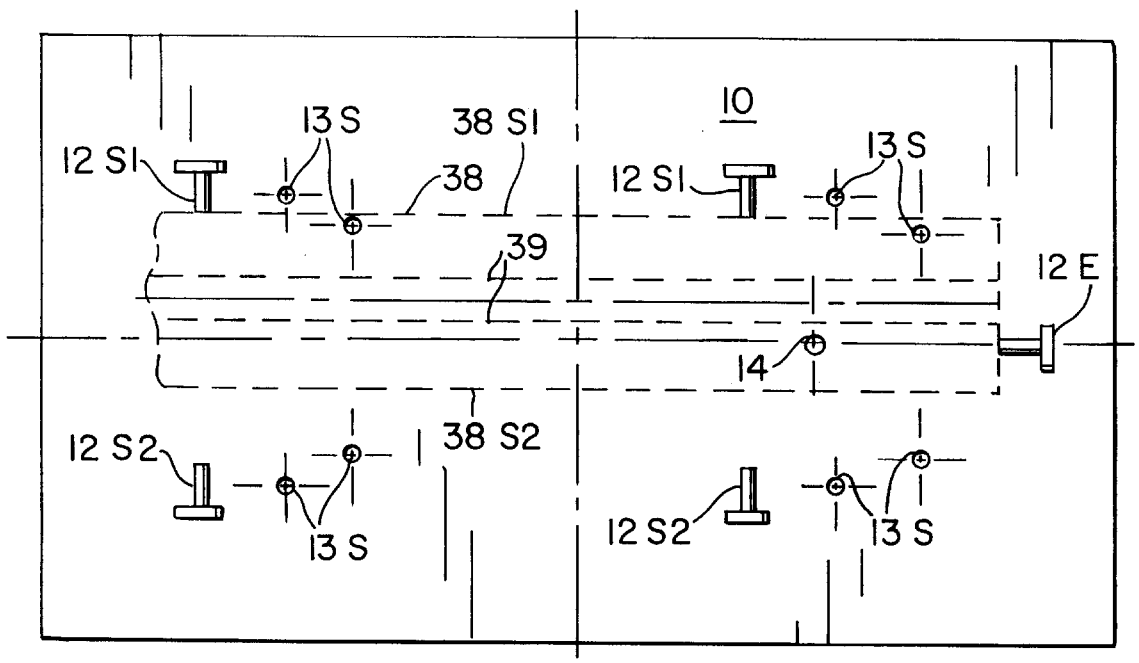
FIG. 6 is a top plan view of the jig plate with guide pins in place for drilling a hole in an aluminum extrusion workpiece.
Figure 7:
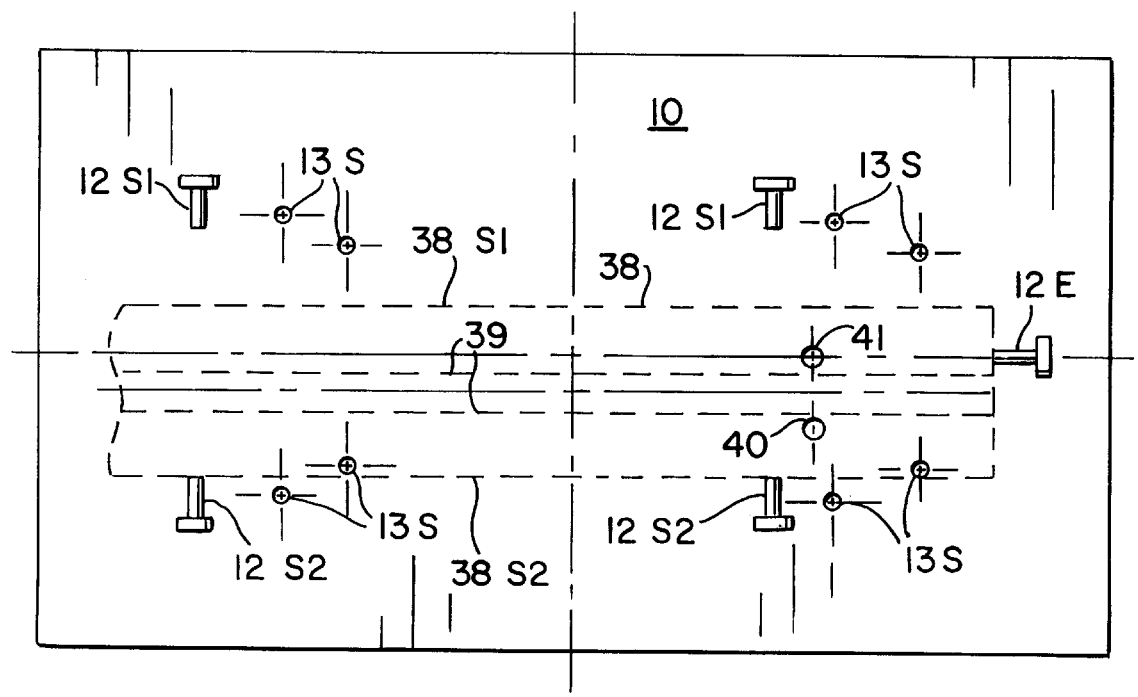
FIG. 7 is the same top plan view of the jig plate of FIG. 6 but with the workpiece moved and drilled with a second hole.

In FIGS. 6 and 7 there is shown a workpiece 38 in broken lines, and its positions with respect to guide pins 12 for the drilling of two spaced holes 40 and 41. In the first step, FIG. 6, workpiece 38 is placed with one long side 38 S1 against two spaced guide side guide pins 12 S1 and against one end guide pin 12 E. In that position the drill press handle is pulled downward and hole 40 is drilled. Drill press handle is then raised to remove the drill bit from hole 40. Workpiece 38 is then moved so as to place the other long side 38 S2 against the other two spaced side guide pins 12 S2 and the same end guide pin 12 E. In this position the second hole 41 is drilled by pulling down the drill press handle. When the drill press handle is raised there will be two spaced drilled holes 40 and 41 as seen in FIG. 7. For example, these two holes 40 and 41, would be necessary for attaching a vertical extrusion to a horizontal extrusion to receive the window glass in the assembly of a window. Other drilled holes may be necessary for other purposes in assembling window sash pieces to window glass.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A drill jig assembly for positioning a workpiece on a bed of a drill press for drilling holes in the workpiece; said assembly including a holder channel attachable to the bed; a jig plate disposed within said channel adapted to be clamped to said channel to provide a horizontal planar upper surface, said jig plate having a plurality of spaced vertical holes through said upper surface, a plurality of guide pins insertable into selected holes in said jig plate to position the workpiece to permit drilling a hole therethrough, said guide pins being upright and transverse of the workpiece, and an adjustable stop subassembly attachable to said holder channel to provide longitudinal positioning of the workpiece for drilling other holes in the workpiece anywhere along its length greater than one half the length of said planar upper surface.

2. The assembly of claim 1 which includes a plurality of leveling studs threadedly engaged with said holder channel and operably engaged beneath said jig plate to level same.

3. The assembly of claim 1 wherein each said guide pin is a T-shaped rod structure having a suitable flag spacer attached thereto.

4. The assembly of claim 1 wherein each said guide pin includes a transverse handle rod welded to a vertical spine rod and a flag spacer of a selected width welded to said spine rod.

5. The assembly of claim 2 which includes adjustable clamping means to clamp said plate to said holder channel in a level position.

6. The assembly of claim 1 wherein said guide pins are selectively locatable in any of said plurality of spaced holes in said plate to provide an end stop and at least one edge guide for the workpiece.

7. The assembly of claim 1 wherein said guide pins are selectively locatable in any of said plurality of spaced holes in said plate to provide an end stop for the workpiece and two spaced edge guides for the workpiece so that a hole is drilled in the workpiece engaged with one of said edge guides and said end stop and after movement of the workpiece to remain engaged with said end stop and another of said edge guides another hole is drilled in the workpiece with such holes aligned and equidistant from the end of the workpiece.

8. The assembly of claim 1 in which said sub assembly includes a substantially inflexible extension beam attachable to said holder channel and an adjustable support carried by said beam and having a vertical hole therein, one of said guide pins being inserted in said hole of said support forming a longitudinal stop for the workpiece.

9. The assembly of claim 8 wherein said extension beam is an angle having horizontal and vertical webs, said adjustable support being a block adjustably and firmly attached thereto, a quick release clamp affixed to said block and adapted to be rapidly clamped to said horizontal web of said angle at any selected location.

10. A drill jig assembly for use with a drill press for drilling holes in selected locations in a metal window vertical frame piece; said assembly comprising a metal channel base having spaced side walls and a bottom therebetween, a plastic plate fitting within said channel base and fastened thereto with spaced clamping screws extending through said side walls, a plurality of T-shaped fixtures positionable to project upwardly from said plate for use in positioning the vertical frame piece for drilling aligned holes therein, spaced adjustable screw means extending through said bottom to support said plate with respect to said channel base in a level position; and adjustable means to position a stop at a selected position with respect to said plate to assist in positioning the vertical frame piece for drilling aligned holes therein.

11. The drill jig assembly of claim 10 wherein said plastic plate is located between said side walls with an upper face of said plate being above the upper extremities of said side walls and resting on said screw means.

12. The drill jig assembly of claim 10 wherein said side walls include threaded holes for respectively received said clamping screws which bear against respective edges of said plate.

13. The drill jig assembly of claim 10 wherein said plurality of T-shaped fixtures consists of five said fixtures arranged in two parallel lines of two said fixtures and one fixture forming a stop to bear against an end of the vertical frame piece; each said fixture being of a selected pattern that will place the frame piece in position for a screw hole to be drilled at a selected location by a drill press when the frame piece bears against two said fixtures in one said line and for another screw hole when moved to engage against two of said fixtures in another of said line with such screw holes being equidistant from an end of the vertical window frame.

14. The drill jig assembly of claim 10 wherein said plate has an upper surface upon which the vertical window frame piece rests while being drilled, said plate having holes drilled perpendicular to said upper surface for receiving said T-shaped fixtures.

15. The drill jig assembly of claim 10 having an extension fixture for positioning said T-shaped fixture as a stop to bear against an end of the vertical frame piece being drilled; the extension fixture comprising an angle beam rigidly attachable to said channel base; a foundation block drilled with a hole to support said T-shaped fixture used as a stop; and a quick release clamp adapted to clamp said block to said angle beam at any selected location along said beam.

\* \* \* \* \*